United States Patent Office 3,532,320
Patented Oct. 6, 1970

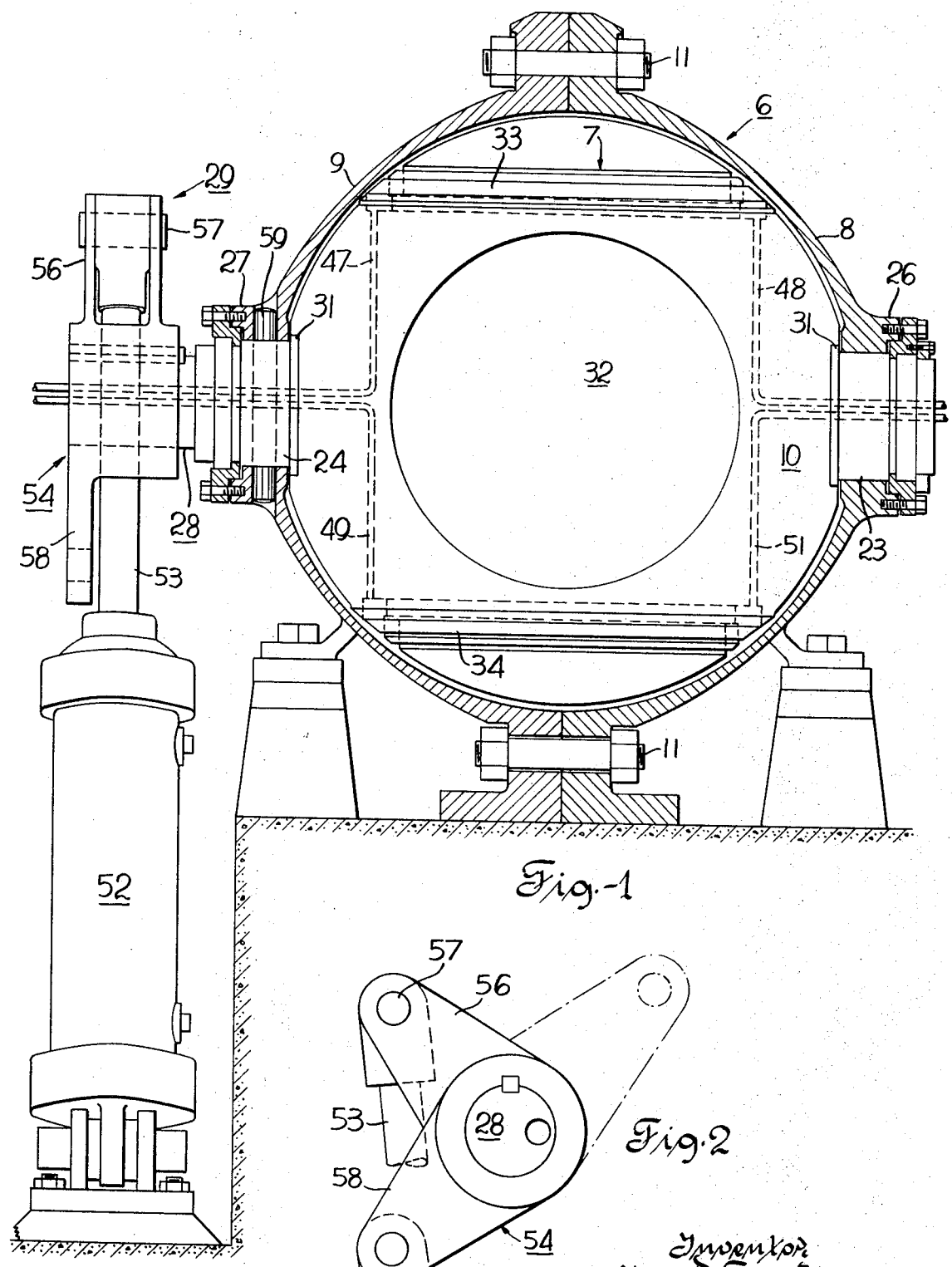

3,532,320
VALVE HAVING DOUBLE SEALING ELEMENTS
Jacob Fisch, York, Pa., assignor to Allis-Chalmers
Manufacturing Company, Milwaukee, Wis.
Filed June 19, 1968, Ser. No. 738,221
Int. Cl. F16k *31/163*
U.S. Cl. 251—62                          4 Claims

ABSTRACT OF THE DISCLOSURE

A valve having a rotatable member for opening and closing the valve. The valve has a pair of seal elements and the rotor can be moved to engage separately either seal element. This permits our sealing element to be serviced while the other is engaged.

---

This invention pertains in general to valves and more particularly to a valve having a double seal element so that either seal can be engaged to block the flow of fluid through the valve.

Although the invention should not be so limited the valve of this invention does have particular application to installations handling large volumes of fluid such as for instance a hydraulic turbine installation. Again, although it is not intended to so limit the invention it does have particular application to spherical valves. Large spherical valves have a rotor which is rotatably contained within the valve body for movement between open and closed positions. One seal element is on the rotor and the other mating seal element is on the valve body. In the usual case a fluid passageway is provided through the rotor with its axis at right angles to the axis of the rotor seal element. The rotor is moved to align the opening through the rotor with an opening through the valve body to permit fluid flow through the valve. The rotor is also movable to align the rotor seal element with the valve body seal element to interrupt the flow of fluid through the valve.

Periodically it is necessary to service the seal elements such as for example replacing packings or seal rings. In order to do this it is necessary to provide means other than the valve itself for interrupting the flow of fluid through the installation. To this end additional valves or shut off means may be provided upstream from the main valve. This, however, results in added expense due to the duplication of the additional shut off means.

With this invention it is contemplated that two seal elements will be provided on at least one of the rotor member or the valve body member. In normal operation one set of seal elements is utilized to open and close the valve. When it is necessary to service these seal elements the rotor is rotated so that the auxiliary seal elements are brought into engagement to block the flow of fluid through the valve. In this position the normal seal elements can be serviced. This arrangement overcomes the necessity of providing an additional shutoff mechanism thereby lowering the cost of the installation.

It is, therefore, the general object of this invention to provide a valve having auxiliary seal elements which will interrupt the flow of fluid while the normal seal elements can be serviced.

A further object of the invention is to provide a valve having at least one set of double seal elements on either the rotor member or valve body member which can be alternately and separately engaged to block the flow of fluid through the valve.

A more specific object of the subject invention is to provide a valve having a pair of seal elements on the rotor and a complementary pair of seal elements on the valve body wherein either seal element on the rotor is capable of separate sealing engagement with either seal element on the valve body.

A further object of the subject invention is to provide a valve of the hereintofore described type with operating means which will permit selective movement of the valve rotor to align either seal element on the rotor with either seal element on the valve body.

These and other objects of the subject invention will become more fully apparent as the following description is read in light of the attached drawings wherein:

FIG. 1 shows a side elevation partly in section of a valve constructed in accordance with the invention;

FIG. 2 is a side elevation of a portion of the operating mechanism for the valve of this invention;

Figure 3:
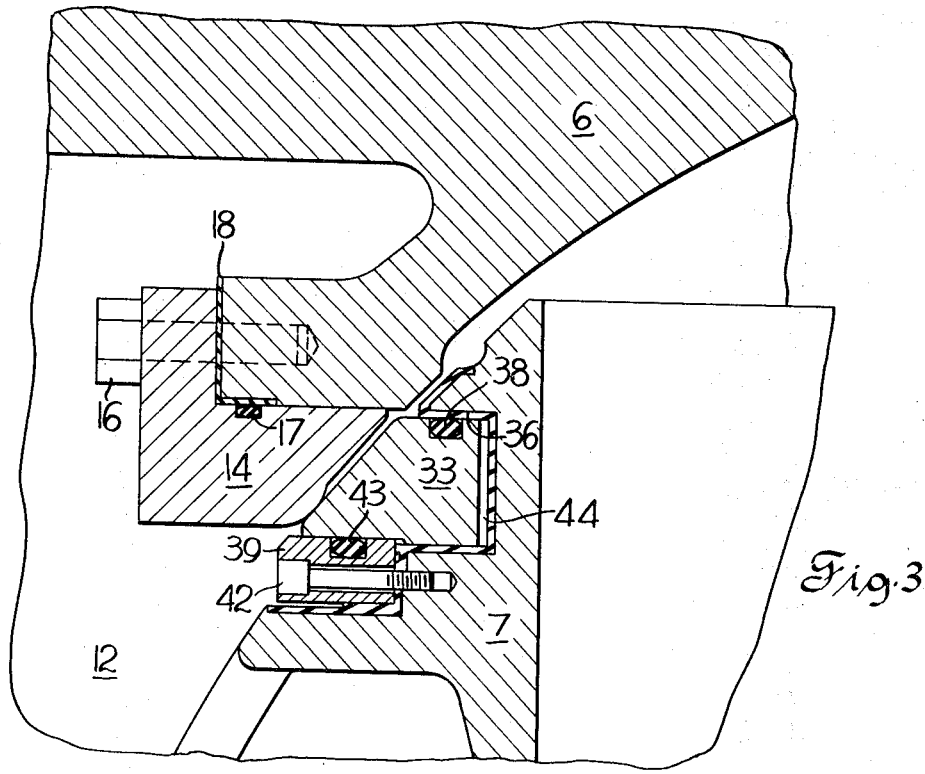
FIG. 3 is an enlarged partial view in section showing one mating pair of seal elements.

Referring to the drawings and more particularly FIG. 1 for purposes of illustration only the valve of the subject invention is shown herein as a spherical valve. The valve is composed of a valve body member 6 and a valve rotor member 7. The valve body member 6 may be constructed in any conventional manner and is shown herein as including two half sections 8 and 9 connected together to form a valve chamber 10. These half sections may be connected together in any conventional manner such as by through bolts 11.

Figure 4:
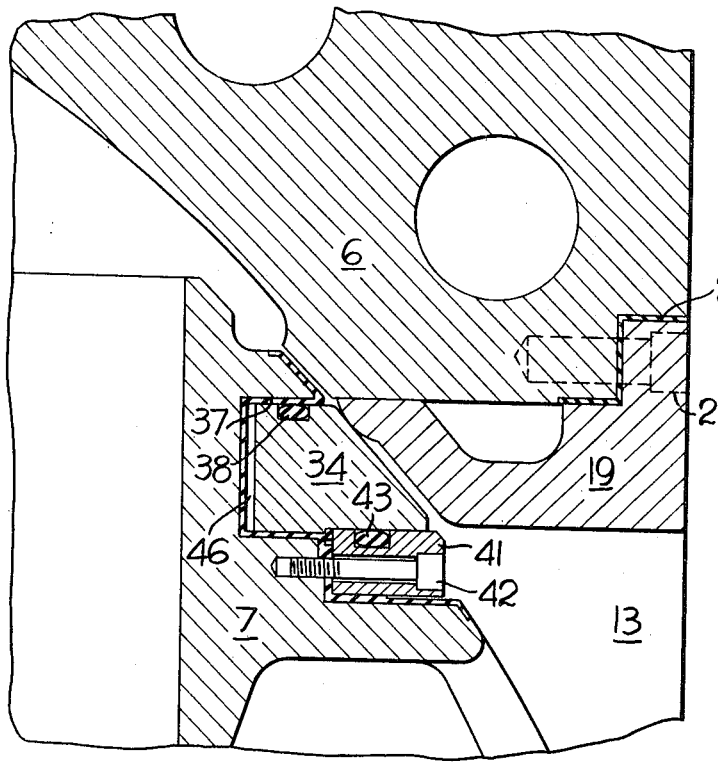
FIG. 4 is an enlarged partial view in section showing the other mating pair of seal elements.

Referring to FIGS. 3 and 4, the body member 6 has an inlet flow passage 12 provided on the upstream end of the valve and an outlet flow passage 13 provided on the downstream end of the valve. Annular seal elements may be provided about these inlet and outlet openings. As shown in FIG. 3 the inlet seal element or as shown herein for purposes of illustration the seal seat is an annular ring 14 rigidly connected to the valve body in any conventional manner such as by capscrews 16. Seals may be provided between the valve seat and the valve body member such as with an O-ring 17 and a gasket 18. A downstream seal element or seal seat 19 is also provided about the discharge opening 13. This downstream seat 19 is also connected to the valve body by means of capscrews 21 and is also provided with a seal such as a gasket 22.

Referring now to FIG. 1 and in the usual manner of construction the rotor member 7 may be provided with a pair of aligned oppositely disposed trunnions 23 and 24. These trunnions are supported respectively in journals 26 and 27 provided in the valve body member 6. Any conventional means may be provided between the trunnions 23 and 24 and the journals 26 and 27 to insure a fluid seal therebetween.

The trunnion 27 has an extended shaft portion 28 thereon for engagement with an operator generally designated 29. Alignment of the rotor member 7 and the body member 6 may be provided by means of shoulders 31 on each trunnion.

The rotor member 7 has a fluid passageway 32 therethrough. A pair of seal elements 33 and 34 are also provided on the rotor member 7. As shown herein for purposes of illustration these seals define planes at right angles to the plane of the diameter of the passageway 32.

Referring to FIGS. 3 and 4 although these seals 33 and 34 are shown herein for purposes of illustration as being hydraulically operated it should be understood that the hydraulic operation is not a necessary part of the invention. Furthermore, the seal elements in the valve body member 6 could be hydraulically operated or neither seal elements need be hydraulically operated. Each seal element 33 and 34 is constructed as a ring slideably contained in an annular groove 36 and 37 provided in the surface of the body member 6. The annular grooves 36 and 37 may be provided with a lining to insure a smooth sliding fit between the groove and the seal elements. An annular groove may be provided in the peripheral surface of each seal element for acceptance of an O-ring 38 to provide sealing engagement between the seal elements and the rotor member. A pair of stop rings 39 and 41 may also be provided in the rotor member to limit the extent of travel of the seal rings 33 and 34. The stop rings 39 and 41 may be connected to the rotor member 7 in any conventional manner such as by capscrews 42. Furthermore, an O-ring 43 may be provided in a groove in the peripheral surface of the stop rings 39 and 41 to provide a seal between the seal elements 33 and 34 and the stop rings.

A fluid pressure chamber 44 and 46 is defined at the rear of each seal element 33 and 34. These pressure chambers receive pressurized fluid to urge the seal elements into sealing engagement with the seal seats 14 and 19. Referring to FIG. 1, pressurized fluid is delivered to the pressure chambers by means of hydraulic conduit. The conduit passes through an axial bore provided through the trunnions 23 and 24. A pressurized inlet conduit 47 provides for selective delivery of hydraulic fluid to the pressure chamber 44 at the rear of the inlet seal element 33. A discharge conduit 48 is also in fluid communication with the pressure chamber 44 to selectively connect this pressure chamber to a fluid sump (not shown). A second inlet conduit 49 provides for selective delivery of pressurized fluid to the pressure chamber 46 at the rear of the downstream seal 34. A second discharge conduit 51 is also in fluid communication with this pressure chamber 46 and with the sump (not shown) to permit the selective discharge of pressure fluid in the seal chamber 46. It is understood that necessary inlet valving would be provided to alternately direct pressurized fluid to either or both pressure chambers 44 and 46 and in conjunction therewith valving would also be provided to selectively relieve the fluid pressure in the pressure chambers. It is believed this valving is of such a nature that it would be obvious to anyone skilled in the art and therefore it has not been shown in the drawings.

Referring further to FIG. 1 and also to FIG. 2 the valve operating means 29 is shown herein for purposes of illustration as a double acting hydraulic operator. This operator is composed of a hydraulic cylinder 52 having a piston rod 53 reciprocably contained therein. Conventional pressurized fluid conduit with the necessary valving (not shown) would be provided for the hydraulic cylinder. Such valving and conduit is of such a conventional and well known construction that it has not been shown in the drawing. A double armed lever member generally designated 54 is rigidly connected to the shaft extention 28 of the trunnion 2. This connection can be made in the conventional key and slot arrangement shown in FIG. 2. For normal operation the free end of piston rod 53 is pivotally connected to arm 56 by means of a pivot pin 57. The other arm 58 is positioned 90 degrees from the arm 56.

As shown in FIG. 2 with the arm 56 in the position shown the valve would be open. In normal operation to close the valve the lever arm 56 would be moved downward aligning seal elements 33 and 34 with seal elements 14 and 19 respectively. Pressurized fluid is then admitted to chamber 46 forcibly moving the seal ring 34 into engagement with the seal seat 19. If it is necessary to service the downstream seal elements the pressure fluid is drained from chamber 46 and admitted into chamber 44. With the upstream seal elements still engaged the downstream seal elements may be serviced.

After this has been accomplished it may be desirable to service the upstream seal. This can be accomplished by moving the arm 56 to the open position shown in solid lines in FIG. 2. At this point a pin 59 is inserted into aligned bores through the trunnion 24 and the journal 27. This pin holds the rotor in the open position and permits removal of the piston rod 53 from the arm 56. The piston is then collapsed and the piston rod 53 is connected to the arm 58 as shown in solid lines in FIG. 2. The pin 59 is then removed and the piston rod extended to move the arm 58 into the position shown occupied by the arm 56 in FIG. 2. This causes the downstream seal element 34 to engage the upstream seal element 14. The upstream seal element 33 is now in the position formerly occupied by the downstream seal element 34 and can be serviced because of the sealing engagement between the upstream seal element 14 and the downstream seal element 34.

From the above description it can be seen that a very simplified and inexpensive arrangement has been provided whereby the sealing elements of a valve can be serviced.

Although only one embodiment of the subject invention has been herein shown and described other embodiments will be apparent to those skilled in the art and it is intended that all such embodiments that come within a reasonable interpretation of the appended claims be covered.

The embodiments of the invention in which an exclusive property or privilege is claimed are defined as follows:

1. A valve comprising: a body member having a valve chamber therein; inlet and outlet flow passages in said body member in communication with said valve chamber; a rotor member positioned in said valve chamber and rotatably connected to said body member, said rotor member having a passageway therethrough for selective alignment with said flow passages to permit flow through said valve chamber; a first seal element on one of said members; a pair of second seal elements on the other of said members, said first and second seal elements constructed and arranged for selective alternate engagement with one another to interrupt flow through said valve chamber: and valve operator means connected to said rotor for selectively moving same to interrupt and permit flow through said valve chamber, said operator means being constructed to selectively move said rotor to cause selective alternate sealing engagement between both second seal members and said first seal member.

2. The valve set forth in claim 1 wherein said first seal element is positioned about the inlet flow passage in said valve body member and said pair of second seal elements are positioned on said rotor member.

3. The valve set forth in claim 2 wherein said valve operator means comprises a double armed lever member connected to said rotor member and a power cylinder positioned for selective alternate engagement with both lever arms of said rotor member, said power cylinder being operable to move said rotor member to engage and disengage one of said second seal elements with said first seal element when connected to one of said lever arms and to engage and disengage the other of said second seal elements with said first seal element when connected to the other of said lever arms.

4. The valve set forth in claim 2 and further comprising a third seal element on said body member positioned about said outlet flow passage.

References Cited
UNITED STATES PATENTS 2,019,502    11/1935    Osgood _____ 251—58 X
3,013,766    12/1961    Dawson _____ 251—172 X

FOREIGN PATENTS 444,841    3/1936    Great Britain.
651,114    3/1951    Great Britain.
200,876    11/1958    Austria.

CLARENCE R. GORDON, Primary Examiner

U.S. Cl. X.R.

137—329.2; 151—175, 234, 292, 309, 315, 316